United States Patent [19]

Nomura

[11] Patent Number: 5,113,355
[45] Date of Patent: May 12, 1992

[54] PRINTER CONTROL SYSTEM

[75] Inventor: Hideki Nomura, Kanagawa, Japan

[73] Assignee: Fuji Xerox Co., Ltd., Tokyo, Japan

[21] Appl. No.: 595,849

[22] Filed: Oct. 10, 1990

[51] Int. Cl.⁵ .............................. G06A 15/00
[52] U.S. Cl. .................. 395/109; 364/242.2; 364/DIG. 1
[58] Field of Search .................. 364/518–523, 364/930 MS, 235 MS, 242.2 MS, 244.3 MS, 941.4 MS, 957.6 MS; 346/154; 400/70, 73, 62, 65

[56] References Cited
U.S. PATENT DOCUMENTS 4,679,153 7/1987 Robinson .................. 364/523

OTHER PUBLICATIONS

"Local Area Networks", ed. by Akihiro Kamiya and published by Maruzen, pp. 229-256.

*Primary Examiner*—Arthur G. Evans
*Attorney, Agent, or Firm*—Finnegan, Henderson, Farabow, Garrett, and Dunner

[57] ABSTRACT

A printer control system which enables queue identifiers, which identify different print jobs, to be sorted such that those queue identifiers identifying print jobs which require fonts that are already loaded in the print server are placed at the head of a print list, and those queue identifiers identifying print jobs which require fonts that are not loaded in the print server are placed at the end of the print list. The print jobs are then processed in the order that the queue identifiers appear on the print list. When a print job to be processed requires fonts that are not loaded into the system a message is displayed on a display unit in order to inform the operator which fonts need to be loaded into the system.

14 Claims, 7 Drawing Sheets

```
                                                            ┌─PRINT JOB DATA
Interpress/Xerox/2.2
BEGIN
  {
  Identifier "XEROX" Identifier "XC1-1-1" Identifier "Classic" 3 MAKEVEC
  FINDFONT
  7620/18-7620/18 SCALE 2
  MODIFYFONT
  0 FSET
  Identifier "XC1-1-1" Identifier "Modern" 3 MAKEVEC
  FINDFONT
  7620/18-7620/18 SCALE 2
  MODIFYFONT
  1 FSET
  }

{
  0.00001 SCALE
  CONCATT
  0 29704 TRANSLATE
  CONCATT
  1-1 SCALE 2
  CONCATT
  0 SETFONT
  2520 2963 SETXY
  String 'F F 3661'
  SHOW
  String 'F F 472 F.'
  SHOW
  String 'F F 2 4 4 B 2 A 3 1 6 B'
  SHOW
  . . . . . . . .
  . . . . . . . .
   }
  }

END
```

PRINTER CONTROL SYSTEM

BACKGROUND OF THE INVENTION

1. Field of the Invention

This invention relates to a printer control system that is linked to a local area network (LAN) and other communications information networks for efficient processing of print requests generated from a plurality of workstations.

2. Discussion of the Related Art

LANs and other communications information networks (hereinafter referred to simply as "networks") generally have a plurality of workstations, files, facsimiles and various other servers linked thereto, as well as a print server that is composed of a print job controller and a printing processor which is controlled by said print job controller in the execution of various print jobs (said print server is hereinafter referred to simply as a "printer").

Figure 7:
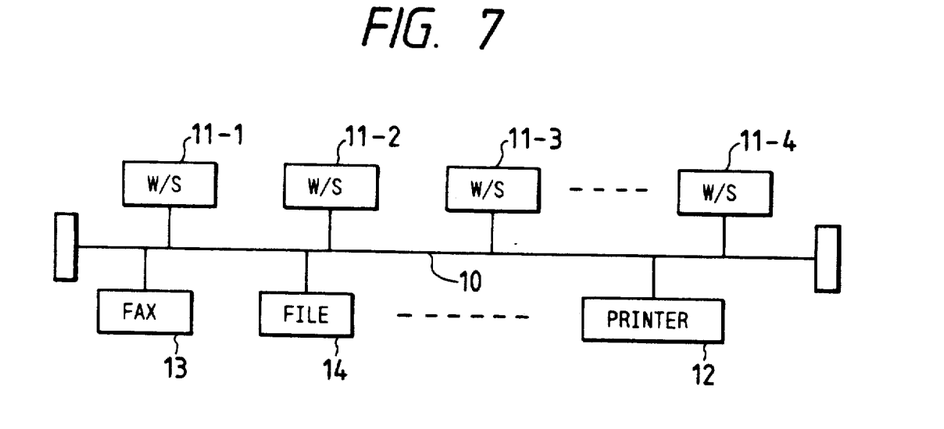
FIG. 7 is a schematic representation of the essential part of the network contemplated by the present invention.

The essential part of a network of the type contemplated by the present invention is shown schematically in FIG. 7, in which the network generally indicated by 10 has linked thereto various servers including a plurality of workstations 11 (11-1, 11-2, . . . 11-n), a printer 12, a facsimile 13 and a file 14.

While many workstations generating print jobs are usually linked to the network, a smaller number of printers 12 are used and, in a typical case, a single printer is used with several workstations.

Thus, in order that a number of print jobs generated from a plurality of workstations 11 are executed in a predetermined order, the print job controller builds a print queue, according to which a specific print processing will be performed.

Taking the printer control system of Xerox Corporation as an example, it is provided with a capability of automatically changing the order of print jobs in the print queue in accordance with the sort option designated by the operator. When this system receives a new print job, the queue identifier of that print job will be inserted into the print queue at an optimum position in accordance with the sort option designated by the operator. The system is so designed that in the absence of a designated sort option, the operator is free to rearrange queue identifiers in the print queue by changing their positions. If a particular sort option is designated by the operator, the system will disregard the position of the queue identifier for the operator-designated job in the print queue and rearrange queue identifiers in the order that complies with the designated particular sort option.

The following four sort options (1)–(4) may be designated (1) print requests are sorted according to the time they are entered (First-in First-out, or FIFO);

(2) the queue identifier for the print job that requires binding is inserted at the top of the print queue (Binder First);

(3) print requests are sorted according to the requested time of printing (Short Job First); and (4) the media (printing media) required in a particular print job are compared with the media loaded in the printer and the queue identifier of a print job which is such that all the media it requires are loaded (e.g., a print job that uses a plurality of media to print graphs on OHP sheets and sentences on sheets of plain paper to create a report containing the graphs) is inserted at the top of the print queue (Stack Match).

The system of the kind outlined above is described in many books, for example, "Local Area Networks" ed. by Akihiro Kamiya and published by Maruzen, pp. 229-256.

When a certain print job is processed for printout with the printer outlined above, namely, at the time when the queue identifier of that print job has come to the head of the print queue, the operator checks as to whether the fonts used in the print job content (which may be exemplified by documents to be actually printed out) are loaded in the printer control system and those which are not loaded are replaced by loaded similar fonts for printout. However, this causes the problem that the document printed out looks different desired by the person who asked the operator to print the document.

SUMMARY OF THE INVENTION

An object, therefore, of the present invention is to provide a printer control system that is free from the aforementioned problems. According to this printer control system of the present invention, the queue identifier of a print job which requires fonts that are all currently loaded is located at the head of the print queue, whereas the queue identifier of a print job which requires fonts that are not all loaded is located closer to the tail of the print queue until all of the necessary fonts are loaded. At the time when the operator has completed the loading of all the necessary fonts, those queue identifiers corresponding to print jobs that require these fonts are located at the head of the print queue. Therefore, the document of interest can be printed out to provide an appearance that is exactly the same as desired by the person who asked the operator to print that document.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

The above-mentioned object of the present invention can be attained by a printer control system that is linked to a network (indicated by 10 in FIG. 7) and which enables the print jobs transferred from workstations (11-1 to 11-n in FIG. 7) to be processed for printout in the order determined in accordance with a preliminarily designated sort option. The printer control system includes a print queue table (1-3 in FIG. 1) having queue identifiers that designate the order of executing the print jobs, a font inspector (1—1 in FIG. 1) which checks as to whether all of the fonts used in the job content of each of the print jobs are loaded in the printer control system, and a print queue manager (1-2 in FIG. 1) which adjusts the positional layout of queue identifiers on the print queue table based on the results of checking by the font inspector.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings:

FIGS. 5-1 and 5-2 is a flowchart showing the sequence of steps in the operation of the first example of the present invention shown in FIG. 4;

DETAILED DESCRIPTION OF THE PREFERRED EMBODIMENTS

The print queue table (1-3 in FIG. 1) has queue identifiers that designate the order of executing the print jobs transferred from a plurality of workstations into the printer control system. The font inspector (1—1 in FIG. 1) checks as to whether all the fonts used in the content of a certain of the accepted print jobs as exemplified by documents to be printed out are loaded in the printer control system. If the result of checking with the font inspector shows that all of the fonts used in the content of that particular print job are loaded, the print queue manager (1-2 in FIG. 1) locates the queue identifier of that print job ahead (closer to the head of the print queue table) of the queue identifier of a print job which requires fonts that are not all loaded. If, on the other hand, the result of checking shows that not all of the fonts used in the content of that particular print job are loaded, the print queue manager inserts the associated queue identifier at the tail of the print queue table so that the execution of that print job will be delayed for a certain period of time. This queue identifier will be inserted at the head of the print queue table at the time when the operator has loaded all of the fonts required for the print job. These procedures enable documents and other job contents to be printed out to provide an appearance that is exactly like the way intended by the person who asked the operator to print those documents.

An example of the present invention is described below with reference to the accompanying drawings.

Figure 1:
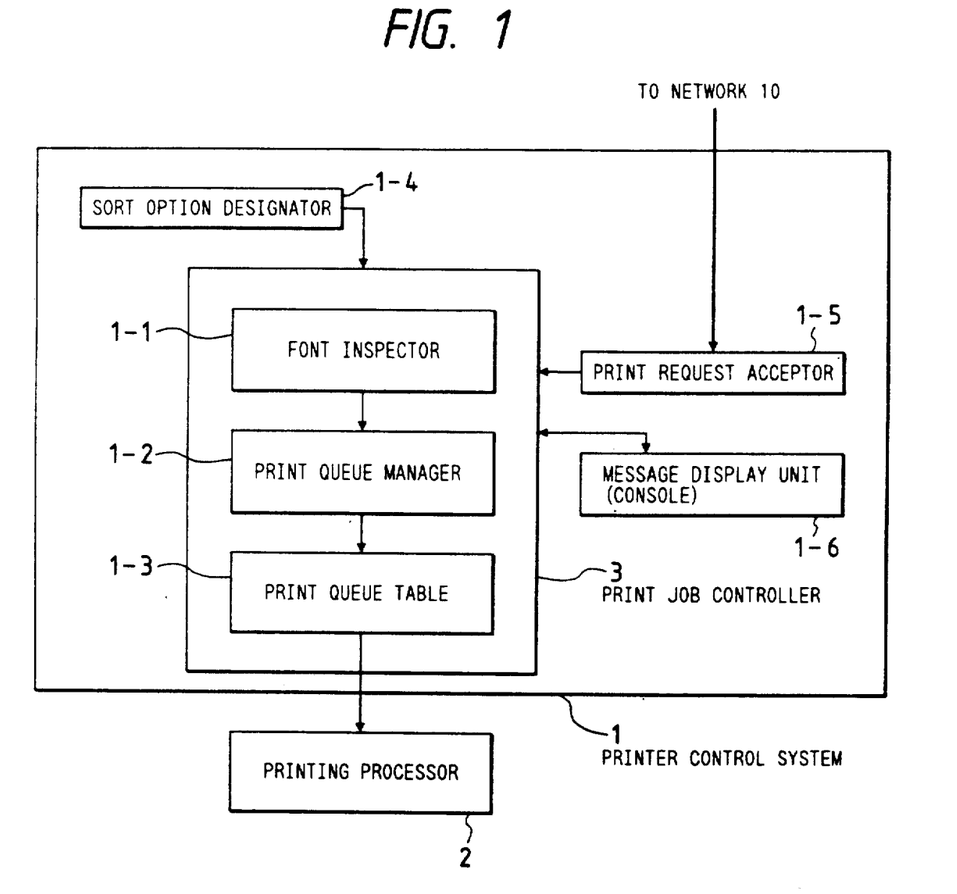
FIG. 1 is a block diagram showing the basic concept of the present invention.

FIG. 1 is a block diagram showing the basic concept of the present invention, which comprises a printer control system 1, a font inspector 1—1, a print queue manager 1-2, a print queue table 1-3 which holds print job identifiers in the form of a queue, a sort option designator 1-4, a print request acceptor 1-5, a message display unit 1-6, a printing processor 2, and a print job controller 3.

The print job transferred over the network 10 (see FIG. 7) is entered into the printer control system 1 through the print request acceptor 1-5.

The data of a print job transferred from a workstation consists of print control data and the job content (e.g., a document to be actually printed out).

The print control data contains a print instruction, media type designating the media to print out, media size, the number of pages to print out, the number of copies to print out, selection between one-sided and two-sided prints, selection between binding and non-binding and a directive for priority (as expressed by the magnitude of priority value), as well as any other control data necessary for executing print jobs.

Figure 2:
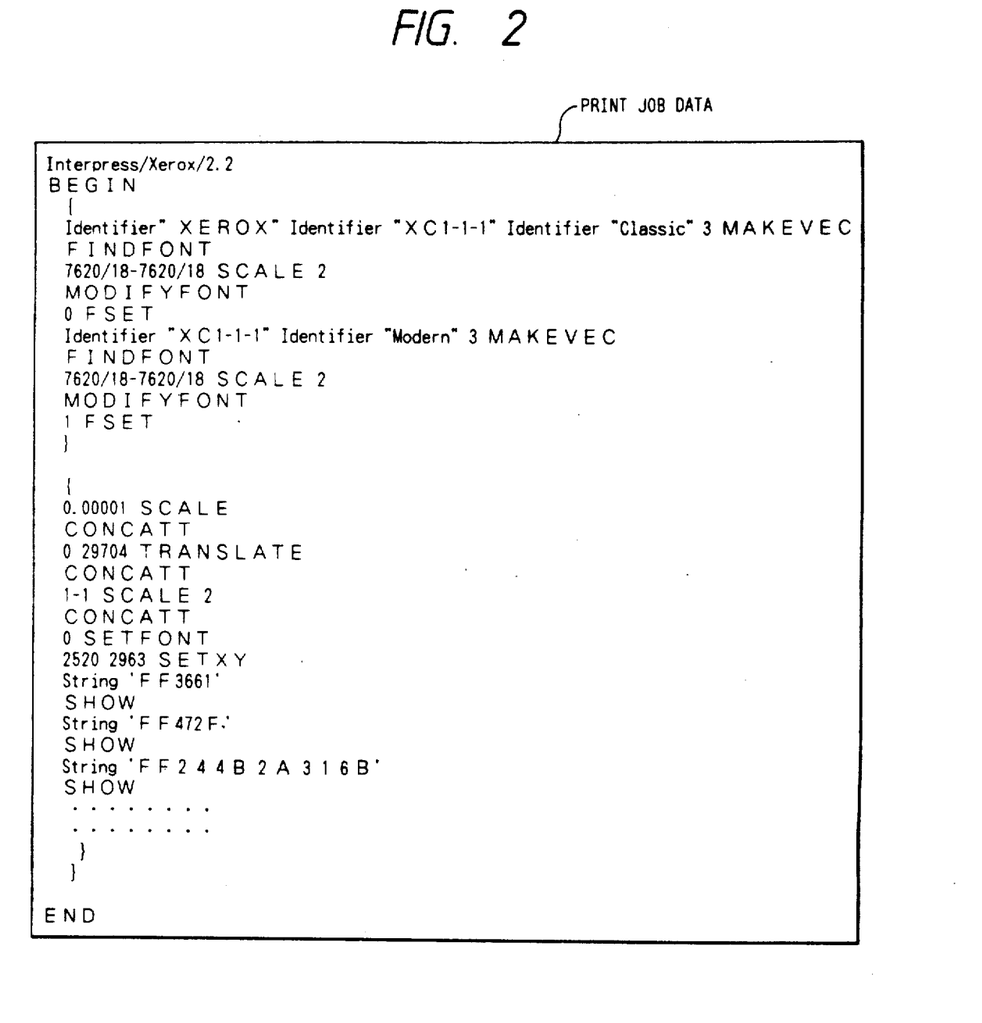
FIG. 2 shows the data of a print job transferred from a workstation.

FIG. 2 shows an example of print job data described by means of a page description language, and this example is an Interpress Master described by means of INTERPRESS ® of Xerox Corporation. The first symbol "Interpress/Xerox/2.2" in FIG. 2 denotes that the data is expressed by INTERPRESS ®, and the next appearing "BEGIN {...}" corresponds to the preamble (control data and, in the example shown, the names of two fonts and their size are set in frames 0 and 1. The body of the first page (job content) starts with the next appearing "{".

Turning back to FIG. 1, the print job data honored by the print request acceptor 3 enters the print job controller 3 in the printer control system 1. The print job manager 1-2 in the print job controller 3 constructs a queue identifier of the accepted print job and places that queue identifier in the queue of the print queue table 1-3 in accordance with the sort option designated by the sort option designator 1-4. Alternatively, the queue identifier of that particular print job is placed at a selected position in the queue of the print queue table 1-3 in accordance with either the order designated by the operator after the sort option was canceled or a preset algorithm.

If the sort option designator 1-4 has already designated a particular sort option for print job that depends upon whether all of the fonts used in the print job content are loaded in the printer control system (said sort option is hereinafter referred to as a "font sort option"), the font inspector 1—1 checks to see if all of the fonts used in the accepted print job are loaded in the printer control system. If the all the necessary fonts are loaded, the print queue manager 1-2 locates the queue identifier of that print job either at the head of the print queue table 1-3 or ahead of the queue identifier of a print job which requires fonts that are not all loaded. If the accepted print job requires fonts that are not all loaded, the queue identifier of that particular job is placed at the tail of the print queue table 1-3 and its execution for printout is delayed for a certain period of time.

In the last-mentioned case where the accepted print job requires fonts that are not all loaded, the types of unloaded fonts and a message requesting their loading are displayed on the message display unit 1-6 at the operator's console. The operator loads the unloaded fonts in accordance with the display on the display unit 1-6 and, in response to a LOAD COMPLETE command from the operator, another sort option is designated and the queue identifier of the accepted print job is located closer the head of the print queue table.

Figure 3:
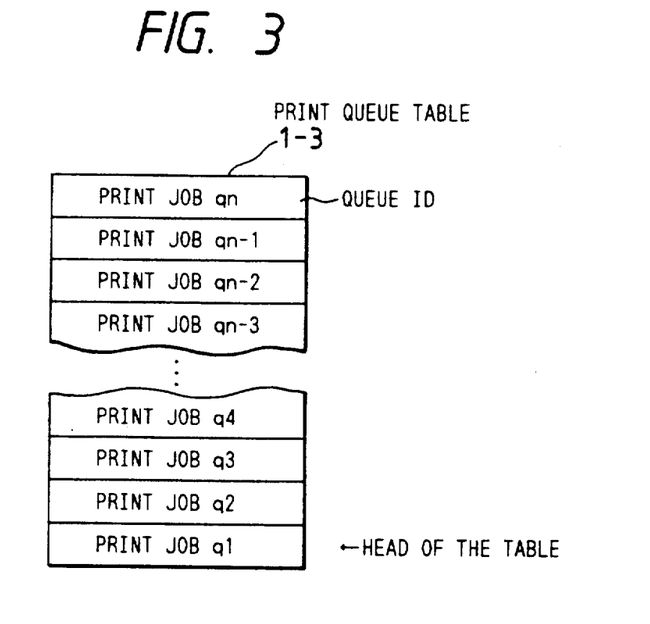
FIG. 3 shows a print queue table.

FIG. 3 shows the print queue table. The print queue to be managed by the print job manager consists of the associated queue identifiers q1, q2, ... qn that are arranged in the order set by a particular sort option or by other methods as described above and the print jobs are successively outputted for printout by the printing processor 2, with the print job content at the head of the queue having identifier q1 being outputted first. The printing processor 2 executes print jobs according to the order of queue identifiers in the print queue table 1-3.

Each of the print job contents is maintained either in a file storage means (not shown) in the printer 12 or in a file storage means (file server) linked to the network 10 and is outputted to the printing processor at the time of printout, namely the time when the associated queue identifier has come to the head of the print queue table.

Figure 4:
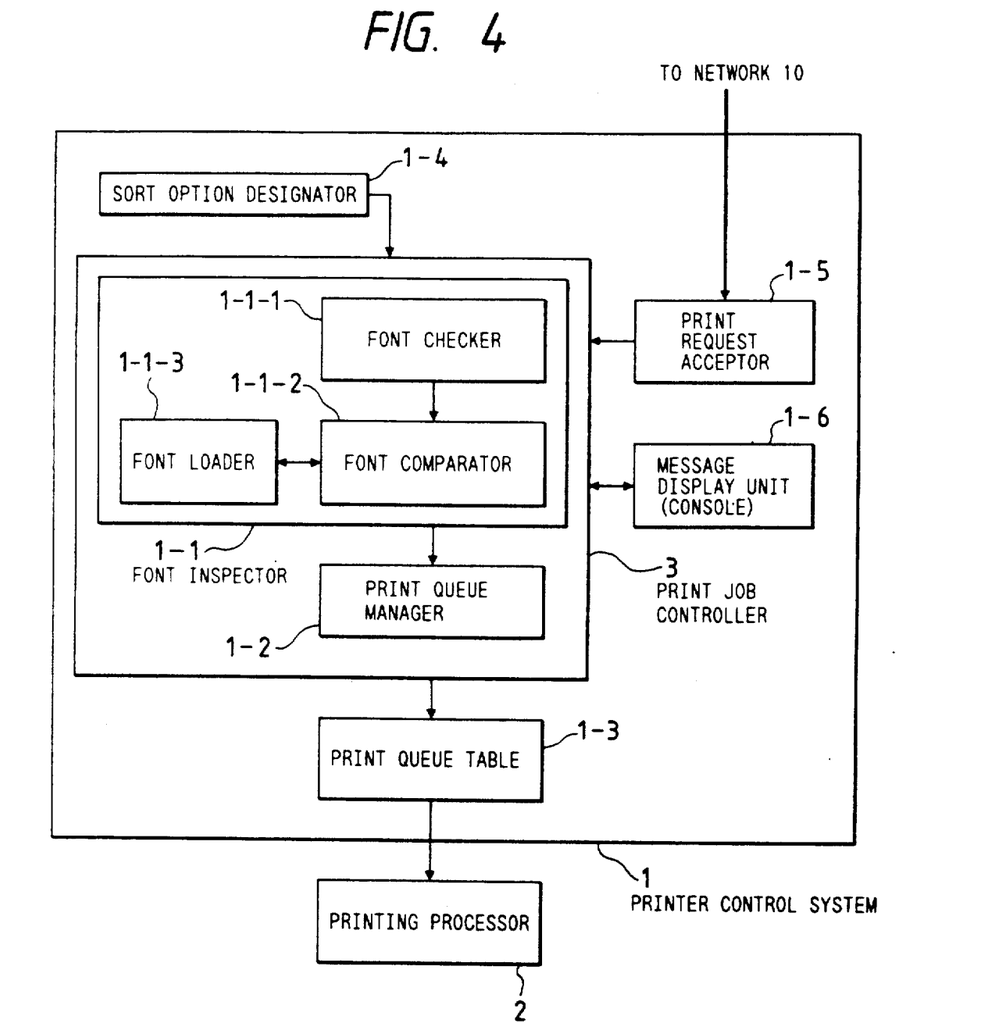
FIG. 4 is a block diagram showing the concept of a first example of the present invention.

FIG. 4 is a block diagram showing the concept of a first example of the present invention and the components which are functionally the same as those shown in FIG. 1 are identified by like numerals. Font checker 1—1—1 checks all the fonts used in the print job content. Font comparator 1—1-2 compares the fonts checked by the font checker 1—1—1 with the fonts loaded in a font loader 1—1-3.

The print job data honored by the print request acceptor 1-5 enters the print job controller 3. In accordance with one of the sort options (1)-(4) and a font sort option designated by the sort option designator 4, the print queue manager 1-2 in the print job controller 3 checks the printing order that complies with the designated sort option and places the queue identifier of the accepted print job at a selected queue position in the print queue table 13.

If a font sort option is designated by the sort option designator 1-4, all of the fonts used in the job content of the print job honored by the print request acceptor 1-5 (as exemplified by documents to be printed out) are checked by the font checker 1—1—1 for subsequent comparison in the font comparator 1—1-2 with the fonts loaded in the font loader 1—1-3.

If the result of the checking shows that all of the necessary fonts are loaded, the queue identifier of the accepted print job is inserted at the head of the print queue table 1-3. If, on the other hand, not all of the necessary fonts are loaded, the queue identifier of the accepted print job is placed at the tail of the print queue table 1-3 so that execution of that job will be delayed for a certain period of time. In this latter case, the types of unloaded fonts and a message requesting their loading are displayed on the message display unit 1-6 at the operator's console. In accordance with the display on the display unit 1-6, the operator loads the unloaded fonts and, in response to a LOAD COMPLETE command from the operator, another sort option is designated and the queue identifier of the print job of interest is inserted at the head of the queue in the print queue table 1-3.

Thus, the printing processor 2 executes the processing of print job contents for printout in accordance with the order of queue identifiers in the rewritten print queue table 1-3.

Figure 51:
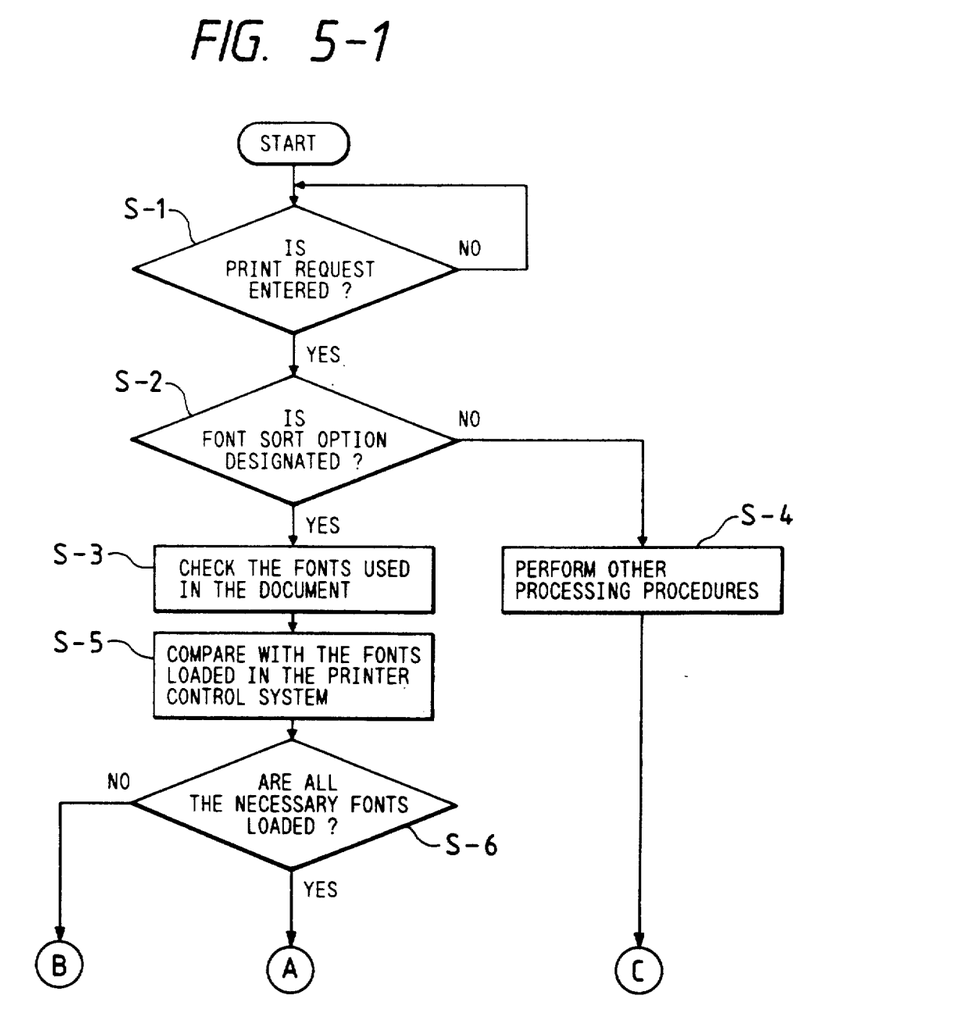
Figure 52:
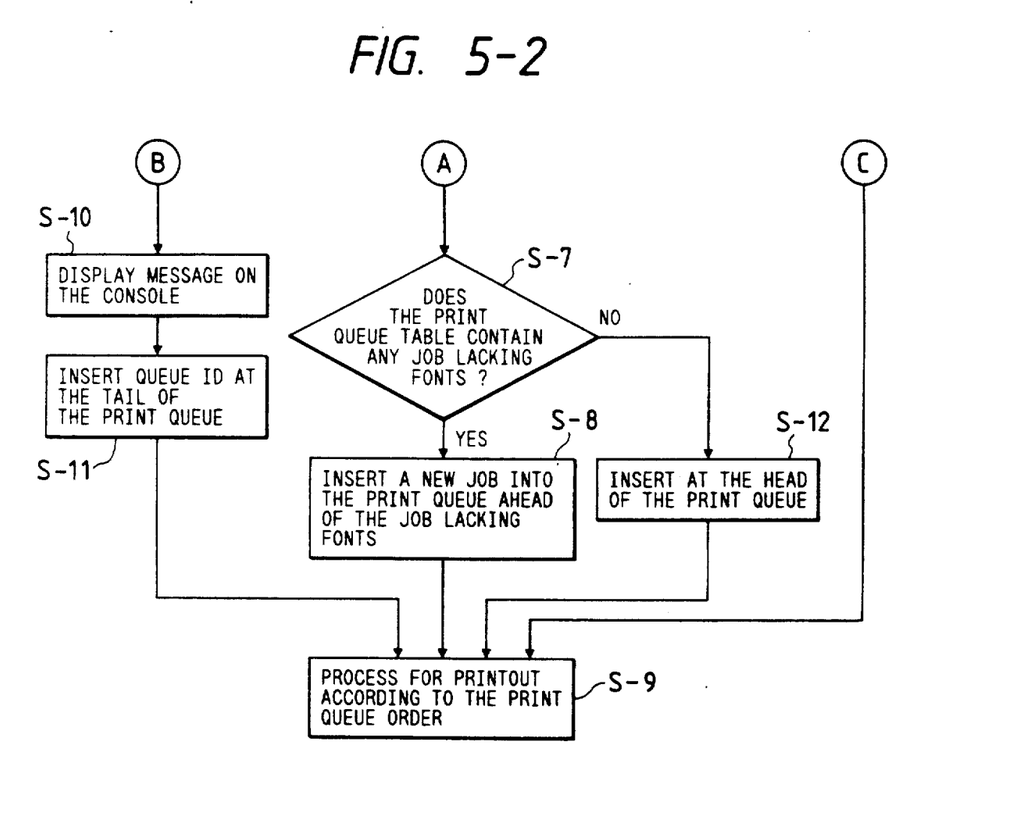

The operation of the first example of the present invention is described below in greater detail with reference to the flowchart shown in FIGS. 5-1 and 5-2.

When the printer starts to run, the printer control system checks for the acceptance of a print job to be processed (step 1 which is hereunder abbreviated as S-1). If the print request is honored, the system checks as to whether a font sort option as defined herein has been designated (S-2). If the answer is negative (including the case where some other sort option has been designated), the operator performs some manipulations including the checking of the printing order in accordance with the other designated sort option (S-4).

If a font sort option has been designated, the fonts used in the job content of the accepted print job are checked (S-3) and compared with the fonts loaded in the font loader (S-5) to see whether all of the necessary fonts are loaded in the font loader (S-6).

If there is any font found unloaded, a message to that effect is displayed together with the type of that unloaded font on the message display unit at the operator's console (S-10) and the queue identifier of the accepted print job is inserted at the tail of print queue table (S-11) so that the execution of the accepted job will be delayed for a certain period of time.

If it is found that all of the necessary fonts are loaded in the font loader, a check is made as to whether the print queue table contains the queue identifier of a print job which requires fonts that are not loaded (i.e., the job content uses an unloaded font) (S-7) and, if the answer is negative, the queue identifier of the accepted print job is inserted at the head of the print queue table (S-12). If the answer is positive, the queue identifier of the accepted print job is inserted ahead of the queue identifier of the print job which requires fonts that are not loaded (S-8).

The accepted print job is executed for printout in accordance with the queue order of the print queue table (S-9).

Figure 6:
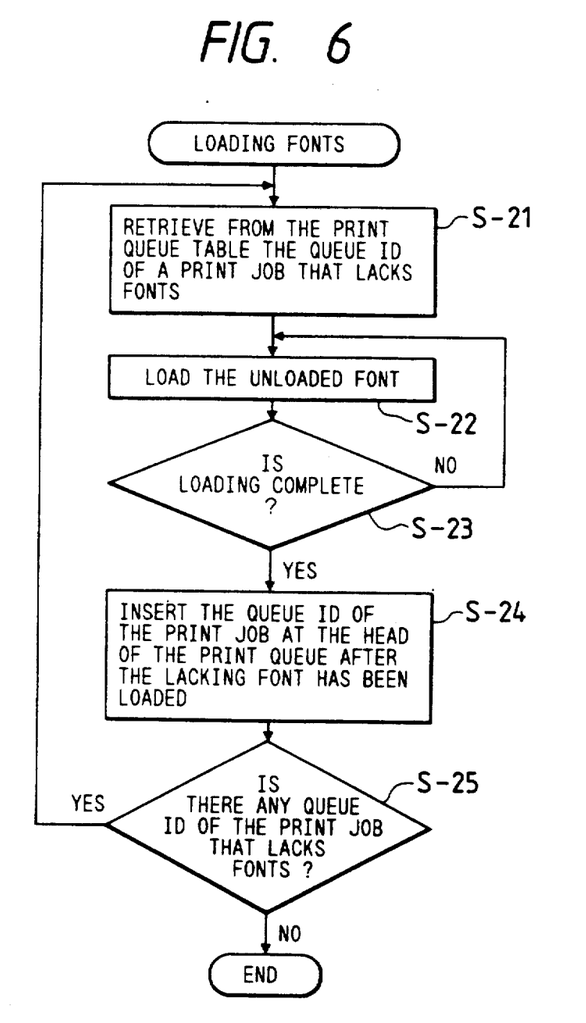
FIG. 6 is a flowchart showing the sequence of steps in the process of loading unloaded fonts.

FIG. 6 shows the sequence of steps in the process of loading unloaded fonts by the operator after the queue identifier of the accepted print job was inserted at the tail of the print queue table in step S-11 in FIG. 5. The operator loads the required font (unloaded font) as he or she looks at the display on the message display unit by the following procedure: First, the operator retrieves from the print queue table the queue identifier of the print job which requires fonts that are not loaded (S-21) and loads the unloaded required font for the job content of the print job keyed to that identifier (S-22). If there is more than one unloaded required font, this loading procedure is repeated until all of the unloaded required fonts are loaded (S-23). Thereafter, the queue identifier of the accepted print job of interest is inserted at the head of the print queue table (S-24).

If the message on the display still indicates the presence of a queue identifier for a print job that requires unloaded fonts (S-25), the above-described procedures are repeated until all of the unloaded required fonts are loaded, whereupon the process of font loading ends.

As described above, in accordance with the present invention, a print job which requires fonts which are already loaded is executed first, whereas a print job which requires fonts which are not loaded is executed after the operator loads the required fonts so that the queue identifier of that print job is inserted at a position closer to the head of the print queue table. As a result, the document printed out will look exactly the way desired by the person who asked the operator to print that document.

In the example described above, the queue identifier of a print job which is such that all of the fonts used in the job content are or have been loaded is placed at the head of the print queue table. It should, however, be noted that the print queue table may be constructed by combining the font sort option defined herein with any of the conventionally used sort options (1) - (4).

The concept of the present invention may be summarized as follows:

Before the queue identifier of a job the print request of which has been honored is placed in the print queue, the fonts used in the job content are checked and the job of interest is processed for printout after all the necessary fonts are loaded. This permits the operator to print out documents and other job contents that look just like the way desired by the person who asked the operator to print the documents.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A printer control system for enabling print jobs transferred from workstations of a network to be processed for printout in the order determined in accordance with a preliminarily designated sort option, comprising:
   a print queue table having queue identifiers that designate the order of executing said print jobs;
   a font inspector which checks as to whether all of the fonts used in the job content of each of said print jobs are loaded in the printer control system; and
   a print queue manager which adjusts the positional layout of queue identifiers on said print queue table based upon the results of checking by said font inspector.

2. The printer control system of claim 1, wherein said print queue manager locates those queue identifiers for print jobs which require fonts which are loaded in the system, at the head of said print queue table, and locates those queue identifiers for print jobs which require fonts which are not loaded in the system, at the tail end of said print queue table.

3. The printer control system of claim 1, wherein said font inspector comprises:
   means for checking which fonts are used in the job content of said print jobs;
   means for loading fonts into the system; and
   means for comparing the fonts used in the job content of said print jobs, as determined by said font checking means, with the fonts loaded in said font loading means.

4. The printer control system of claim 1, further comprising:
   means for displaying messages which request loading of fonts required by said print jobs which are not already loaded in the system.

5. The printer control system of claim 1, further comprising:
   means for designating a sort option to be used to sort said queue identifiers in said print queue table.

6. A print server for printing out print jobs transferred from workstations of a network in the order determined in accordance with a preliminarily designated sort option, comprising:
   means for accepting a print request from said network;
   a print queue table having queue identifiers that designate the order of executing said print jobs;
   means for checking whether all of the fonts used in the job content of each of said print jobs are loaded in the printer control system;
   a print queue manager which adjusts the positional layout of queue identifiers on said print queue table based upon the results of checking by said font checking means; and
   means for printing said print jobs in the order identified in said print queue table.

7. The print server of claim 6, wherein:
   said print queue manager locates those queue identifiers for print jobs which require fonts which are loaded in the print server, at the head of said print queue table, and locates those queue identifiers for print jobs which require fonts which are not loaded in the print server, at the tail end of said print queue table.

8. The print server of claim 6, wherein said font checking means comprises:
   means for checking which fonts are used in the job content of said print jobs;
   means for loading fonts into the print server; and
   means for comparing the fonts used in the job content of said print jobs, as determined by said font checking means, with the fonts loaded in said font loading means.

9. The print server of claim 6, further comprising:
   means for displaying messages which request loading of fonts required by said print jobs which are not already loaded in the print server.

10. The print server of claim 6, further comprising:
    means for designating a sort option to be used to sort said queue identifiers in said print queue table.

11. A printer control system for enabling print jobs transferred from workstations of a network to be processed for printout in the order determined in accordance with a preliminarily designated sort option, comprising:
    a print queue table having queue identifiers that designate the order of executing said print jobs;
    means for checking whether all of the fonts used in the job content of each of said print jobs are loaded in the printer control system; and
    a print queue manager which adjusts the positional layout of queue identifiers on said print queue table based upon the results of checking by said font checking means, said print queue manager locates those queue identifiers for print jobs which require fonts which are loaded in the system, at the head of said print queue table, and locates those queue identifiers for print jobs which require fonts which are not loaded in the system, at the tail end of said print queue table.

12. The printer control system of claim 11, wherein said font checking means comprises:
    means for checking which fonts are used in the job content of said print jobs;
    means for loading fonts into the system; and
    means for comparing the fonts used in the job content of said print jobs, as determined by said font checking means, with the fonts loaded in said font loading means.

13. The printer control system of claim 11, further comprising:
    means for displaying messages which request loading of fonts required by said print jobs which are not already loaded in the system.

14. The printer control system of claim 11, further comprising:
    means for designating a sort option to be used to sort said queue identifiers in said print queue table.

* * * * *